(12) United States Patent
Leleannec et al.

(10) Patent No.: US 11,463,712 B2
(45) Date of Patent: Oct. 4, 2022

(54) RESIDUAL CODING WITH REDUCED USAGE OF LOCAL NEIGHBORHOOD

(71) Applicant: InterDigital VC Holdings, Inc., Wilmington, DE (US)

(72) Inventors: Fabrice Leleannec, Cesson-Sevigne (FR); Ya Chen, Cesson-Sevigne (FR); Philippe Bordes, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/276,669

(22) PCT Filed: Nov. 20, 2019

(86) PCT No.: PCT/US2019/062332
§ 371 (c)(1),
(2) Date: Mar. 16, 2021

(87) PCT Pub. No.: WO2020/106795
PCT Pub. Date: May 28, 2020

(65) Prior Publication Data
US 2022/0038719 A1 Feb. 3, 2022

(30) Foreign Application Priority Data
Nov. 21, 2018 (EP) .................... 18306539

(51) Int. Cl.
*H04N 19/18* (2014.01)
*H04N 19/124* (2014.01)
(Continued)

(52) U.S. Cl.
CPC .......... *H04N 19/18* (2014.11); *H04N 19/124* (2014.11); *H04N 19/13* (2014.11); *H04N 19/176* (2014.11); *H04N 19/186* (2014.11); *H04N 19/70* (2014.11)

(58) Field of Classification Search
CPC ...... H04N 19/18; H04N 19/124; H04N 19/13; H04N 19/176; H04N 19/186; H04N 19/70
See application file for complete search history.

(56) References Cited

U.S. PATENT DOCUMENTS

| 2012/0183235 A1* | 7/2012 | Sasai | H04N 19/18 |
| | | | 382/233 |
| 2013/0195182 A1* | 8/2013 | Kung | H04N 19/60 |
| | | | 375/240.12 |

(Continued)

FOREIGN PATENT DOCUMENTS

EP 2775713 A1 9/2014

OTHER PUBLICATIONS

Coban et al., "CE7:Coefficient Coding (Subtest 7.1.1)", Document: JVET-K0069-v2, Joint Video Experts Team (JVET) of ITU-T SG 16 WP 3 and ISO/IEC JTC 1/SC 29/WG 11, 11th Meeting: Ljubljana, SI, pp. 1-9, Jul. 10-18, 2018.

(Continued)

*Primary Examiner* — Joseph Suh
(74) *Attorney, Agent, or Firm* — Xiaoan Lu

(57) ABSTRACT

Different implementations are described, particularly implementations for video encoding and decoding using entropy coding of quantized transform coefficients. The method comprises: determining context model indices for one or more syntax elements of quantized transform coefficients of a transform block, wherein different context model indices are obtained for quantized transform coefficients in different regions of the transform block and a single context index is used for at least one region of the transform block; and selecting for the one or more syntax elements associated (Continued)

with a particular quantized transform coefficient one of several context models based on the determined content model index.

18 Claims, 17 Drawing Sheets

(51) Int. Cl.
*H04N 19/13* (2014.01)
*H04N 19/176* (2014.01)
*H04N 19/186* (2014.01)
*H04N 19/70* (2014.01)

(56) References Cited

U.S. PATENT DOCUMENTS

| | | | |
|---|---|---|---|
| 2013/0301738 A1* | 11/2013 | Kim | H04N 19/154 375/240.18 |
| 2018/0234681 A1* | 8/2018 | Fu | H04N 19/13 |
| 2019/0149828 A1* | 5/2019 | Jeong | H04N 19/44 375/240.12 |
| 2020/0288145 A1* | 9/2020 | Chuang | H04N 19/11 |

OTHER PUBLICATIONS

Chen et al., "Algorithm Description of Joint Exploration Test Model 7 (JEM 7)", Joint Video Exploration Team (JVET) of ITU-T SG 16WP3and ISO/IEC JTC 1/SC 29/WG 11, Document JVET-G1001-v1, Turin, Italy, pp. 1-48, Jul. 13, 2017, 48 page.

Bross et al., "Versatile Video Coding (Draft 3)", Document: JVET-L1001-v2, Joint Video Experts Team (JVET) of ITU-T SG 16 WP 3 and ISO/IEC JTC 1/SC 29/WG 11, 12th Meeting: Maco, CN, pp. 1-168, Oct. 3-12, 2018.

* cited by examiner

```
for( k ... ) { // max 28 bins
  sig_flag[ k ]
  if( sig_flag[ k ] ) {
    gt1_flag[ k ]
    if( gt1_flag[ k ] )
      par_flag[ k ]
  }
} for( k ... ) { // max 4 bins
  if( gt1_flag[ k ] )
    gt2_flag[ k ]
} for( k ... ) { // EP bins
  remainder[ k ]
} for( k ... ) { // NEW: EP
  abs_level[ k ]
}
```

| | Random Access Main 10 | | | | |
| --- | --- | --- | --- | --- | --- |
| | Over VTM-2.0.1 | | | | |
| | Y | U | V | EncT | DecT |
| Class A1 | 0.01% | 0.32% | 0.06% | 104% | 106% |
| Class A2 | 0.05% | -0.01% | 0.09% | 99% | 99% |
| Class B | -0.03% | -0.30% | -0.20% | 99% | 98% |
| Class C | -0.03% | 0.07% | -0.18% | 104% | 112% |
| Class E | | | | | |
| Overall | -0.01% | -0.02% | -0.08% | 101% | 103% |
| Class D | -0.05% | -0.03% | 0.22% | 102% | 99% |
| Class F (optional) | #VALUE! | #VALUE! | #VALUE! | #DIV/0! | #DIV/0! |

RESIDUAL CODING WITH REDUCED USAGE OF LOCAL NEIGHBORHOOD

TECHNICAL FIELD

This application is in the field of video compression, and it aims at reduced complexity of the residual coding compared to existing video compression systems.

BACKGROUND

For the compression of video data, block-shaped regions of the pictures are coded using inter-picture prediction to exploit temporal redundancy between different pictures of the video source signal or using intra-picture prediction to exploit spatial redundancy in a single picture of the source signal. For this purpose, depending on the used compression standard, a variety of block sizes in the picture may be specified. The prediction residual is then be further compressed using a transform to remove correlation inside the residuals before it is quantized and finally even more compressed using entropy coding, also called residual coding.

Current video compression standards such as H.264/MPEG-4 AVC and High Efficiency Video Coding (HEVC) use the so-called Context-adaptive binary arithmetic coding (CABAC) for entropy coding. CABAC uses binary arithmetic coding which means that only binary values are encoded. Correspondingly, non-binary-valued symbols have to be converted to binary values prior to the arithmetic coding. Then, for each bit, the coder selects a probability model to use and uses information from nearby elements to optimize the probability estimate. Finally, arithmetic coding is applied to compress the data.

Furthermore, standards currently under development such as JEM VTM-1 or VVC Draft 3 (see "Versatile Video Coding (Draft 3)", Document: JVET-L1001, Joint Video Exploration Team (WET) of ITU-T SG16 WP3 and ISO/IEC JTC1/SC29/WG11, 12th Meeting: Macao, CN, 3-12 Oct. 2018.) employ a so-called local neighboring template of a current coefficient to model the CABAC context used to signal some syntax elements associated to the current coefficient.

SUMMARY

According to an aspect of the present disclosure, a method for encoding and/or decoding a picture is disclosed. Such a method comprises determining context model indices for one or more syntax elements of quantized transform coefficients of a transform block, wherein different context model indices are obtained for quantized transform coefficients in different regions of the transform block and a single context index is used for at least one region of the transform block; and selecting for the one or more syntax elements associated with a particular quantized transform coefficient one of several context models based on the determined content model index.

According to another aspect of the present disclosure, an apparatus for encoding and/or decoding a picture is disclosed. Such an apparatus comprises one or more processors, wherein said one or more processors are configured to:

determine context model indices for one or more syntax elements of quantized transform coefficients of a transform block, wherein different context model indices are obtained for quantized transform coefficients in different regions of the transform block and a single context index is used for at least one region of the transform block; and select for the one or more syntax elements associated with a particular quantized transform coefficient one of several context models based on the determined content model index.

According to another aspect of the present disclosure, an apparatus for encoding and/or decoding a picture is disclosed which comprises:

means for determining context model indices for one or more syntax elements of quantized transform coefficients of a transform block, wherein different context model indices are obtained for quantized transform coefficients in different regions of the transform block and a single context index is used for at least one region of the transform block; and means for selecting for the one or more syntax elements associated with a particular quantized transform coefficient one of several context models based on the determined content model index.

The present disclosure also provides a computer program product including instructions, which, when executed by a computer, cause the computer to carry out the methods described.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

Additional features and advantages of the present disclosure will be made apparent from the following detailed description of illustrative embodiments which proceeds with reference to the accompanying figures

BRIEF DESCRIPTION OF THE DRAWINGS

FIG. 16 illustrates the impact of the proposed first embodiment on the coding efficiency in RA configuration (one Intra period) of the VVC testing conditions.

It should be understood that the drawings are for purposes of illustrating examples of various aspects and embodiments and are not necessarily the only possible configurations. Throughout the various figures, like reference designators refer to the same or similar features.

DETAILED DESCRIPTION

For clarity of description, the following description will describe aspects with reference to embodiments involving video compression technology such as, for example, HEVC, JEM and/or H.266. However, the described aspects are applicable to other video processing technologies and standards.

Figure 1:
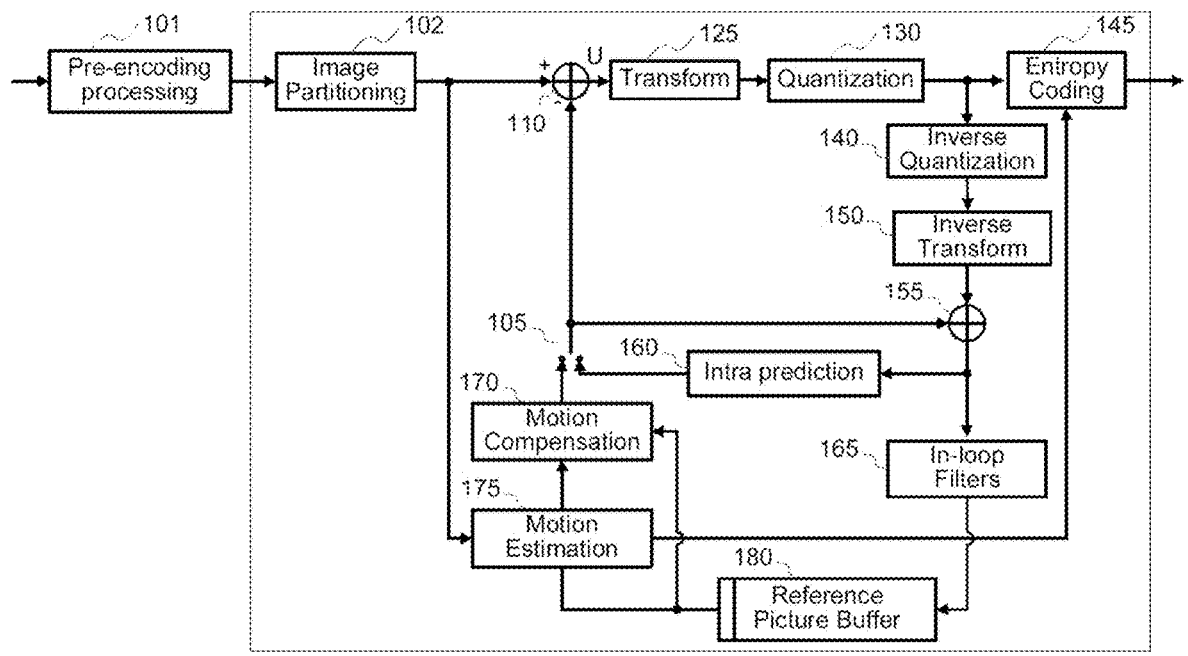
FIG. 1 illustrates a block diagram of an example of a generic video compression scheme.

FIG. 1 illustrates an example video encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

To encode a video sequence with one or more pictures, a picture is partitioned (102), for example, into one or more slices where each slice can include one or more slice segments. In HEVC, a slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

In the encoder 100, a picture is encoded by the encoder elements as described below. The picture to be encoded is processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

Figure 2:
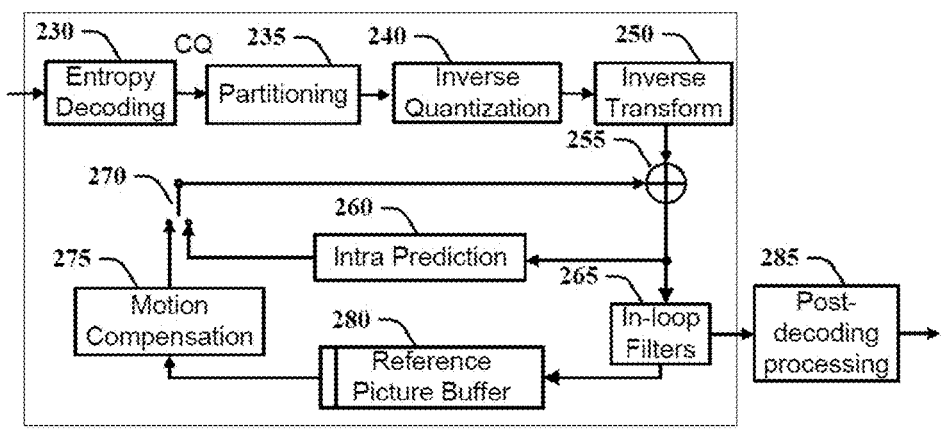
FIG. 2 illustrates a block diagram of an example of a generic video decompression scheme.

FIG. 2 illustrates a block diagram of a video decoder 200. In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101).

The post-decoding processing can use metadata derived in the pre-encoding processing and signaled in the bitstream.

The present application proposes an adaptation of transform coefficient entropy coding, in an encoder and decoder, such as those illustrated in FIGS. 1 and 2, respectively, wherein various rectangular Coding Unit sizes can be used to represent the picture in the compressed domain.

In the HEVC video compression standard or technologies similar to HEVC Coding Units are defined as follows. A picture to be encoded or decoded is divided into so-called Coding Tree Units (CTUs), which are the basic units of coding, and a consecutive set of CTUs is grouped into a slice. A CTU usually comprises three Coding Tree Blocks (CTBs), a block for luminance samples and two blocks for chrominance samples, and associated syntax elements. The Coding Tree Units can be further split into Coding Units (CUs), which are the smallest coding elements for the prediction type decision, i.e. whether to perform inter-picture or intra-picture prediction. Finally, the Coding Units can be further split into one or more Prediction Units (PUs) in order to improve the prediction efficiency.

Figure 3A:
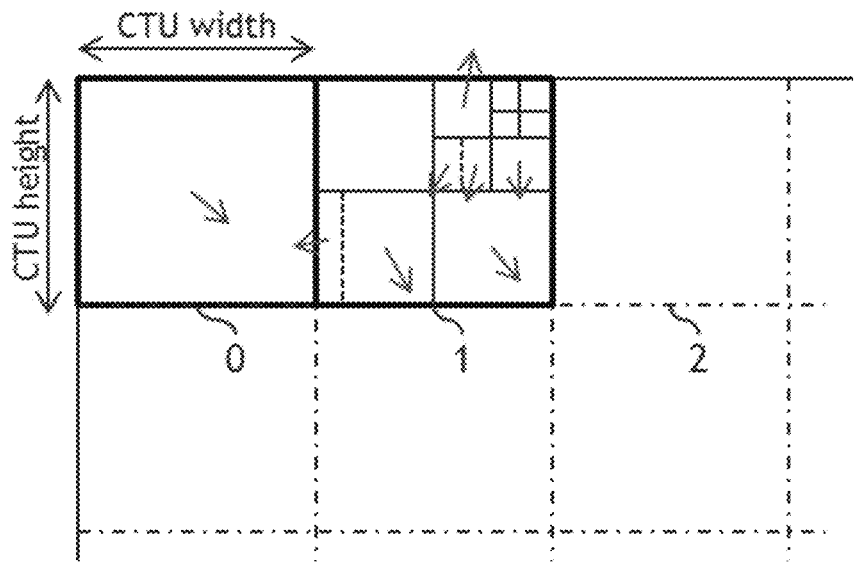
FIG. 3 illustrates in a) some Coding Tree Units representing a compressed HEVC picture and in b) the division of a Coding Tree Unit into Coding Units, Prediction Units and Transform Units.

An example for a partitioning of a part of a picture into CTUs 0, 1, 2 is shown in FIG. 3*a*. In the figure, the left CTU 0 is directly used as is while the CTU 1 to the right of it is partitioned into multiple smaller sections based on the signal characteristics of the picture region covered by the CTU. The arrows indicate the prediction motion vectors of the respective section.

Figure 3B:
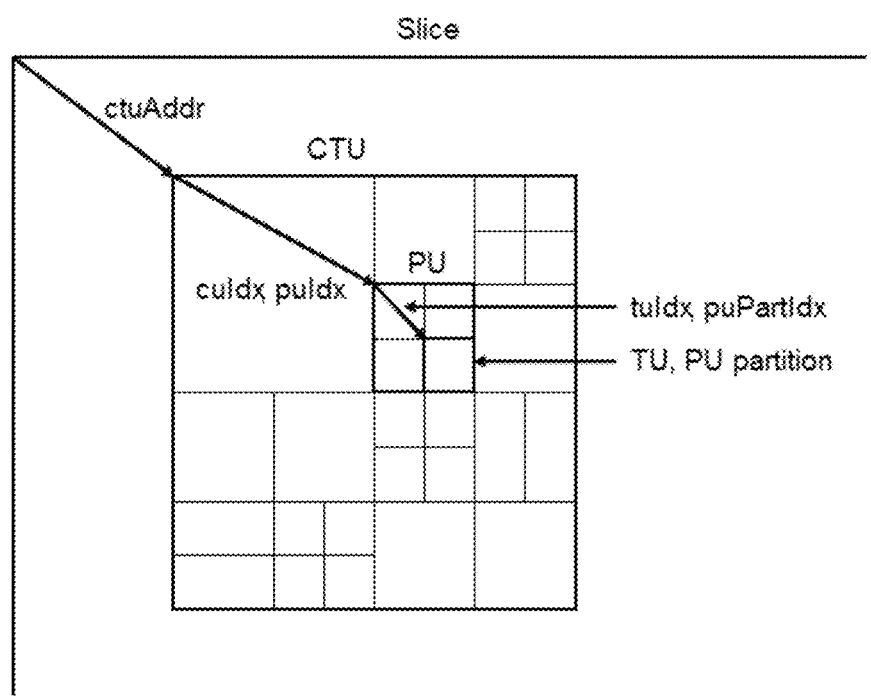

A CTB is the root of a quadtree partitioning into Coding Blocks (CB), and a Coding Block may be partitioned into one or more Prediction Blocks (PB) and forms the root of a quadtree partitioning into Transform Blocks (TBs). A Transform Block (TB) larger than 4×4 is divided into 4×4 sub-blocks of quantized coefficients called Coefficient Groups (CG). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. An example for the division of a Coding Tree Unit into Coding Units, Prediction Units and Transform Units is shown in FIG. 3*b*.

Figure 4:
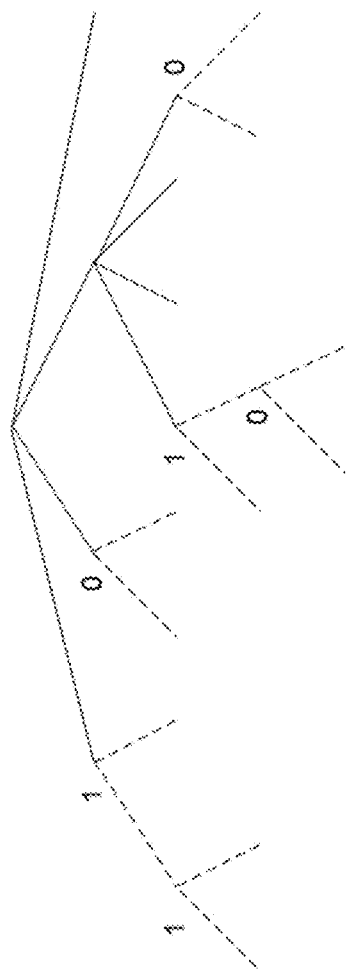
FIG. 4 illustrates an example where a Coding Tree Unit is split both in a quad-tree and in a binary-tree fashion and the corresponding coding tree representation of the Coding Tree Unit.
Figure 4:
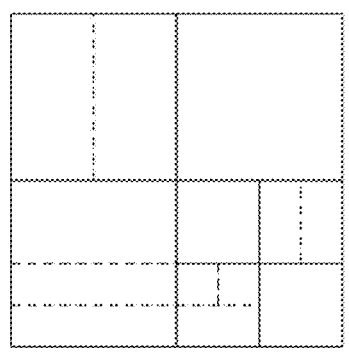

New emerging video compression tools include a Coding Tree Unit representation in the compressed domain, which allow to represent picture data in a more flexible way in the compressed domain. The advantage of this flexible representation of the coding tree is that it provides increased compression efficiency compared to the CU/PU/TU arrangement of the HEVC standard. The so-called Quad-Tree plus Binary-Tree (QTBT) coding tool provides this increased flexibility. It consists in a coding tree where coding units can be split both in a quad-tree and in a binary-tree fashion. An example of a block partitioning of a Coding Tree Unit using QTBT and the corresponding coding tree representation is illustrated in FIG. 4.

The splitting of a coding unit is decided on the encoder side through a rate distortion optimization procedure, which consists in determining the QTBT representation of the CTU with minimal rate distortion cost. In the QTBT technology, a CU has either square or rectangular shape. The size of a coding unit is always a power of 2, and typically goes from 4 to 128. In addition to this variety of rectangular shapes for a coding unit, this new CTU representation has the following different characteristics compared to HEVC.

The QTBT decomposition of a CTU is made of two stages: first the CTU is split in a quad-tree fashion, then each quad-tree leaf can be further divided in a binary fashion. This is illustrated on the right of FIG. 4 where solid lines represent the quad-tree decomposition phase and dashed lines represent the binary decomposition that is spatially embedded in the quad-tree leaves. In each splitting node of the binary tree a flag signals whether horizontal splitting (0) or vertical splitting (1) was used, for the Quad-Tree splitting no indication of the splitting type is needed.

In intra slices, the Luma and Chroma block partitioning structure is separated, and decided independently.

No more CU partitioning into predictions units or transform units is employed. In other words, each Coding Unit is systematically made of a single prediction unit (previously 2N×2N prediction unit partition type) and single transform unit (no division into a transform tree).

Figure 5A:
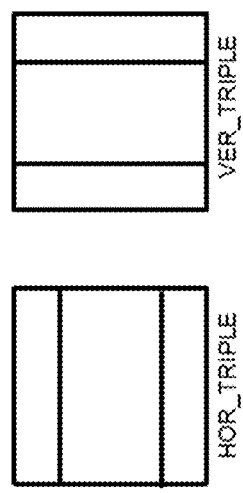
FIG. 5 illustrates in a) horizontal and vertical Triple Tree Coding Unit splitting modes and in b) the complete set of Coding Unit splitting modes supported in the video coding scheme considered in this application.
Figure 5B:
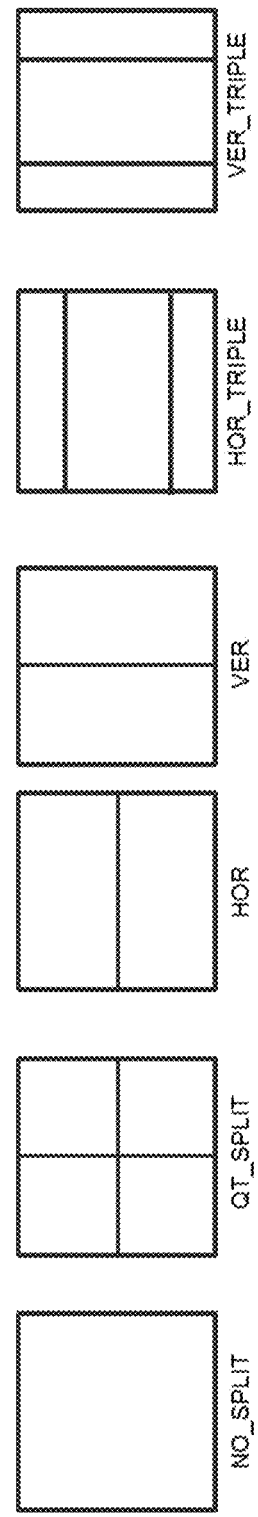

An additional CU split mode adopted in the VVC (Versatile Video Coding) video compression standard, called the horizontal or vertical triple tree splitting mode, consists in dividing a coding unit (CU) into 3 sub-coding-units (sub-CUs), with respective sizes equal to ¼, ½ and ¼ of the parent CU size in the direction of the considered spatial division. This is illustrated in FIG. 5*a*. The complete set of CU splitting modes supported in the video coding scheme considered in this application is shown on FIG. 5*b*.

In the following, the proposed methods are described in detail. First the coefficient quantization and entropy coding performed in VVC draft 3 is described. Then, different embodiments for the coding of the significant coefficient flag are proposed.

Dependent scalar quantization was proposed in a JVET contribution entitled "Description of SDR, HDR and 360° video coding technology proposal by Fraunhofer HHI", Document JVET-J0014, 10th Meeting: San Diego, US, 10-20 Apr. 2018 (hereinafter "JVET-J0014"), where two scalar quantizers with different reconstruction levels are used for quantization. In comparison to conventional independent scalar quantization (as used in HEVC and VTM-1), the main effect of this approach is that the set of admissible reconstruction values for a transform coefficient depends on the values of the transform coefficient level that precedes the current transform coefficient level in reconstruction order.

The approach of dependent scalar quantization is realized by: (a) defining two scalar quantizers with different reconstruction levels and (b) defining a process for switching between the two scalar quantizers.

Figure 6:
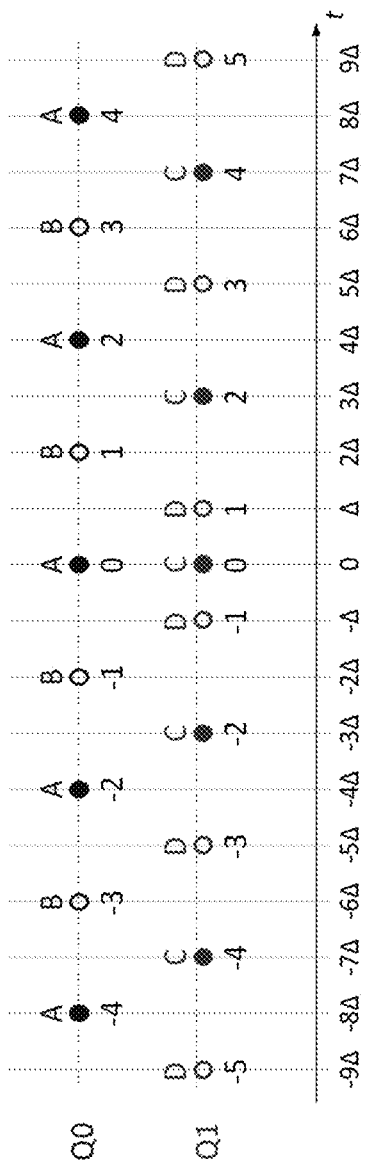
FIG. 6 illustrates two scalar quantizers used in the VVC dependent quantization system.

The two scalar quantizers used, denoted by Q0 and Q1, are illustrated in FIG. 6. The location of the available reconstruction levels is uniquely specified by a quantization step size $\Delta$. If the fact that the actual reconstruction of transform coefficients uses integer arithmetic is neglected, the two scalar quantizers Q0 and Q1 are characterized as follows:

Q0: The reconstruction levels of the first quantizer Q0 are given by the even integer multiples of the quantization step size $\Delta$. When this quantizer is used, a dequantized transform coefficient t' is calculated according to $$t'=2 \cdot k \cdot \Delta$$

where k denotes the associated quantized coefficient (transmitted quantization index).

Q1: The reconstruction levels of the second quantizer Q1 are given by the odd integer multiples of the quantization step size A, plus the reconstruction level equal to zero. A dequantized transform coefficient t' is computed as a function of the quantized coefficient k as follows:

$$t'=(2 \cdot k - \text{sgn}(k)) \cdot \Delta,$$

where sgn(•) is the sign function defined as:

$$\text{sgn}(x)=(k==0?0:(k<0?-1:1)).$$

The scalar quantizer used (Q0 or Q1) is not explicitly signalled in the bitstream. Instead, the quantizer used for a current transform coefficient is determined by the parity of the quantized coefficient that precedes the current transform coefficient in coding/reconstruction order.

Figure 7:
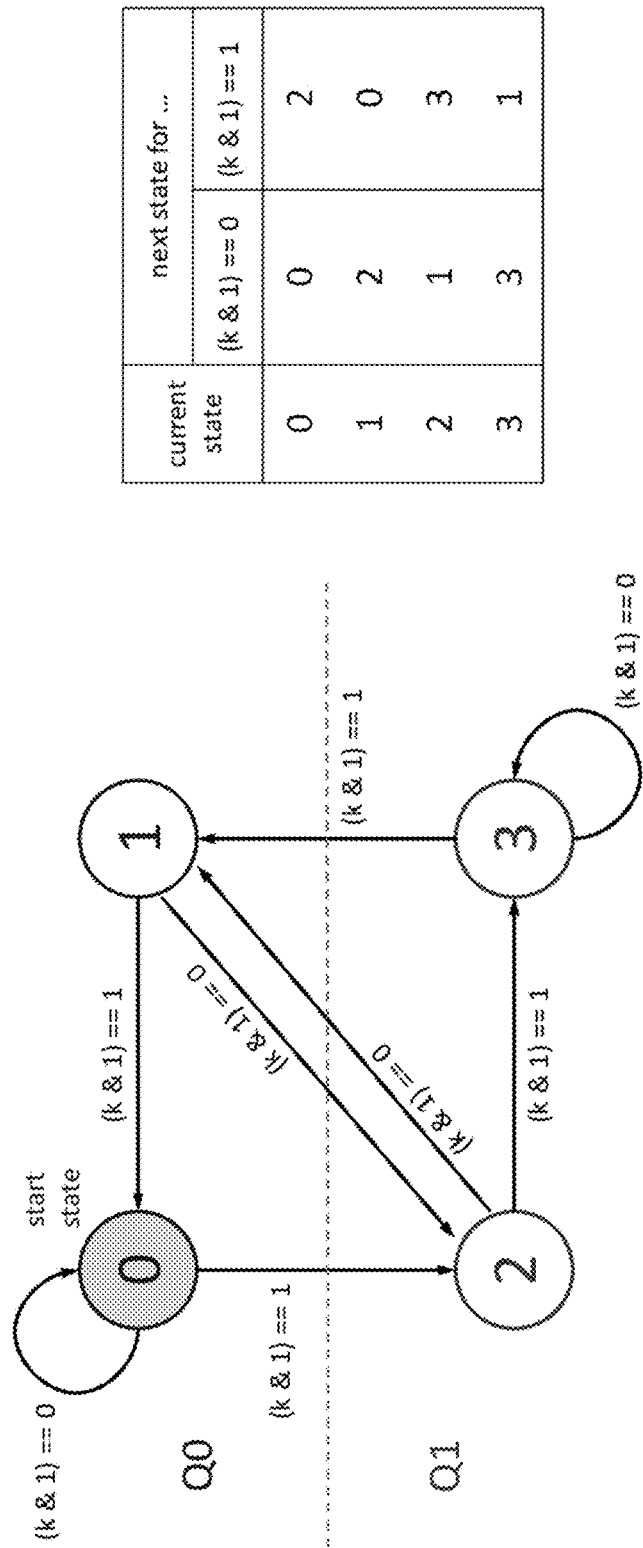
FIG. 7 illustrates a finite sate machine used to switch between scalar quantizers in VVC.

As illustrated in FIG. 7, the switching between the two scalar quantizers (Q0 and Q1) is realized via a state machine with four states, respectively equal to 0, 1, 2 or 3. The state of a given quantized coefficient is uniquely determined by the parity of the quantized coefficient that precedes current quantized coefficient in coding/reconstruction order. At the start of the inverse quantization for a transform block, the state is set equal to 0. The transform coefficients are reconstructed in scanning order (i.e., in the same order they are entropy decoded). After a current transform coefficient is reconstructed, the state is updated as shown in FIG. 7. k is the quantized coefficient. Next state depends on the current state and the parity (k & 1) of current quantized coefficient k:

$$\text{state}=\text{stateTransTable}[\text{state}][k \& 1],$$

where stateTransTable represents the state transition table shown in FIG. 7 and the operator & specifies the bit-wise "and" operation in two's-complement arithmetic.

In the following, it is described how the quantized coefficients, contained in a transform-block (TB), are entropy coded and decoded.

First, a transform block is divided into 4×4 sub-blocks of quantized coefficients called Coding Groups (CG). The entropy coding/decoding is made of several scanning passes, which scan the TB according to the diagonal scanning order shown by FIG. 8.

Transform coefficient coding in VVC involves five main steps: scanning, last significant coefficient coding, significance map coding, coefficient level remainder coding, absolute level and sign data coding.

A scan pass over a TB then consists in processing each CG sequentially according the diagonal scanning order, and the 16 coefficients inside each CG are scanned according to the considered diagonal scanning order as well. A scanning pass starts at the last significant coefficient in the TB and processes all coefficients until the DC coefficient.

The entropy coding of transform coefficients comprises up to 7 syntax elements in the following list:
sig_flag: significance of a coefficient (zero/nonzero).
gt1_flag: indicates if the absolute value of a coefficient level is greater than 1
par_flag: indicates the parity of the coefficient which is greater than 1
gt2_flag: indicates if the absolute value of a coefficient level is greater than 2
remainder: remaining value for absolute value of a coefficient level (if value is larger than that coded in previous passes)
abs_level: value of the absolute value of a coefficient level (if no CABAC bin has been signaled for current coefficient for max number of bin budget matters)
sign_flag: sign of a significant coefficient (0: positive, 1: negative)

Once a quantized coefficient's absolute value is known by decoding a subset of the above elements (apart from the sign), then no further syntax element is coded for that coefficient, with regards to its absolute value. In the same way, the sign-flag is signaled only for non-zero coefficients.

All necessary scan passes for a given CG are coded until all the quantized coefficients in that CG can be reconstructed, before going to the next CG.

The overall decoding TB parsing process is made of the following mains steps:
1. Decode the Last Significant coefficient Coordinate. This includes the following syntax elements:
   last_sig_coeff_x_prefix, last_sig_coeff_y_prefix, last_sig_coeff_x_suffix, and last_sig_coeff_y_suffix
   This provides the decoder with the spatial position (x- and y-coordinates) of the last non-zero coefficients in the whole TB.

Then for each successive CG from the CG containing the last significant coefficient in the TB to the top-left CG in the TB, the following steps apply.
2. Decode the CG significance flag, which is called coded_sub_block_flag in the HEVC specification.
3. Decode the significant coefficient flag for each coefficient in the considered CG. This corresponds to the syntax element sig_flag. This indicates which coefficients is non-zero in the CG.

Next parsing stages aim at signaling the coefficient level, for coefficients known as non-zero in the considered CG. This involves the following syntax elements.
4. gt1_flag: this flag indicates if current coefficient's absolute value is higher than 1 or not. If not, the absolute value if equal to 1.
5. par_flag: this flag indicates if current quantized coefficient is even or not. It is coded if the gt1_flag of current quantized coefficient is true. If the par_flag is zero then the quantized coefficient is even, otherwise it is odd. After the par_flag is parsed on the decoder side, the partially decoded quantized coefficient is set equal to (1+gt1_flag+par_flag)
6. gt2_flag: this flag indicates if current coefficient's absolute value is higher than 2 or not. If not, the absolute value if equal to (1+gt1_flag+par_flag). The gt2_flag is coded if (1+gt1_flag+par_flag) is greater or equal to 2. Once the gt2_flag is parsed, then the quantized coefficient value becomes (1+gt1_flag+par_flag+(2*gt2 flag)) on the decoder side.
7. remainder: this encodes the absolute value of the coefficient. This applies to partially decoded absolute value is greater or equal to 4. Note that in VVC draft 3, a max number of regular coded bin (i.e. context-based arithmetically coded bins) budget is fixed for each coding group. Therefore, for some coefficients, only the sig_flag, gt1_flag and par_flag elements may be signaled, while for other coefficients, the gt2_flag may also be signaled. Thus the remainder value that is coded and parsed is computed relative to the already decoded flags for that coefficient, hence as a function of the partially decoded quantized coefficient.
8. abs_level: this indicates the absolute value of the coefficients for which no flag (among sig_flag, gt1_flag, par_flag or gt2_flag) has been coded in the considered CG, for max number of regular coded bins matters. Tis syntax element is Rice-Golomb binarized and bypass-coded similarly to the remainder syntax element.

9. sign_flag: this indicates the sign of the non-zero coefficients. This is bypass-coded, i.e. coded by simply writing/parsing the bin value as a bit in the VVC bit-stream.

Figures 8, 9:
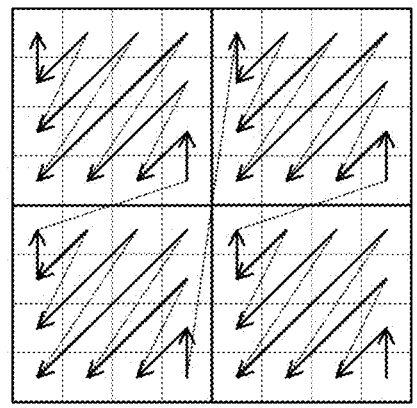
FIG. 8 illustrates scanning orders between CGs and coefficients in an 8×8 Transform Block.
FIG. 9 illustrates the coding/parsing of syntax element in a 4-pass process.

The coding/parsing of the above listed syntax elements, i.e. the sig_flag, gt1_flag, par_flag, gt2_flag, remainder and abs_level syntax elements according to VVC draft 3, is performed in a 4-pass process, as illustrated in FIG. 9. EP means "equip-probable", which means the concerned bins are not arithmetically coded, but are coded in by-pass mode. The by-pass mode consists in writing/parsing directly a bit, which is generally equal to the binary syntax element (bin) one wants to encode or parse.

In the VVC draft 3 the sig_flag flag is context-based arithmetically coded, with a context which is selected among plural possible contexts, as follows. The context used is identified by its index. The index used for a given coefficient is computed as follows.

Figure 10:
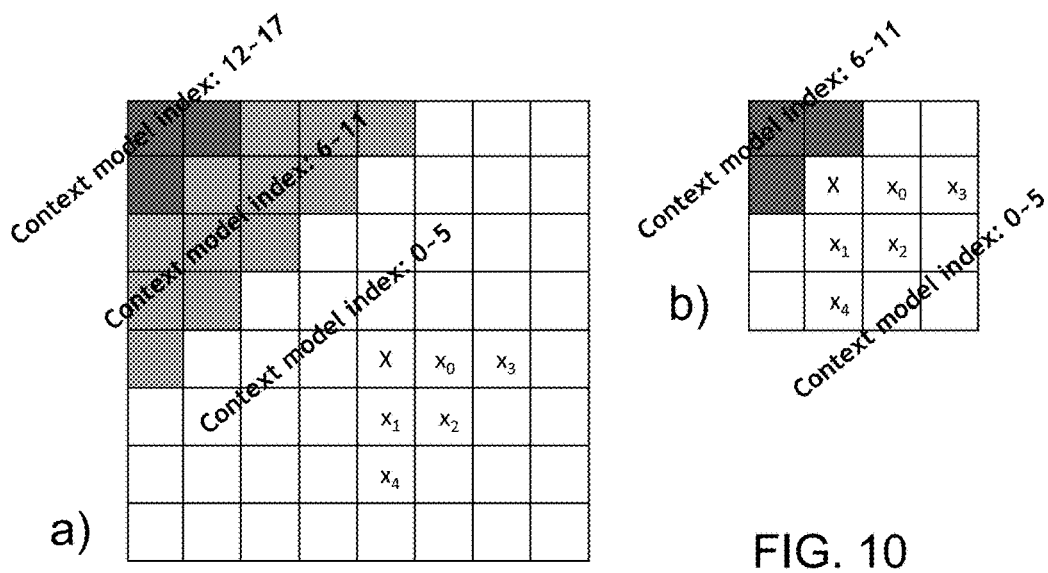
FIG. 10 illustrates contexts used for the coding of the coefficient significance flag respectively in (a) Luma and in (b) Chroma.
Figure 11:
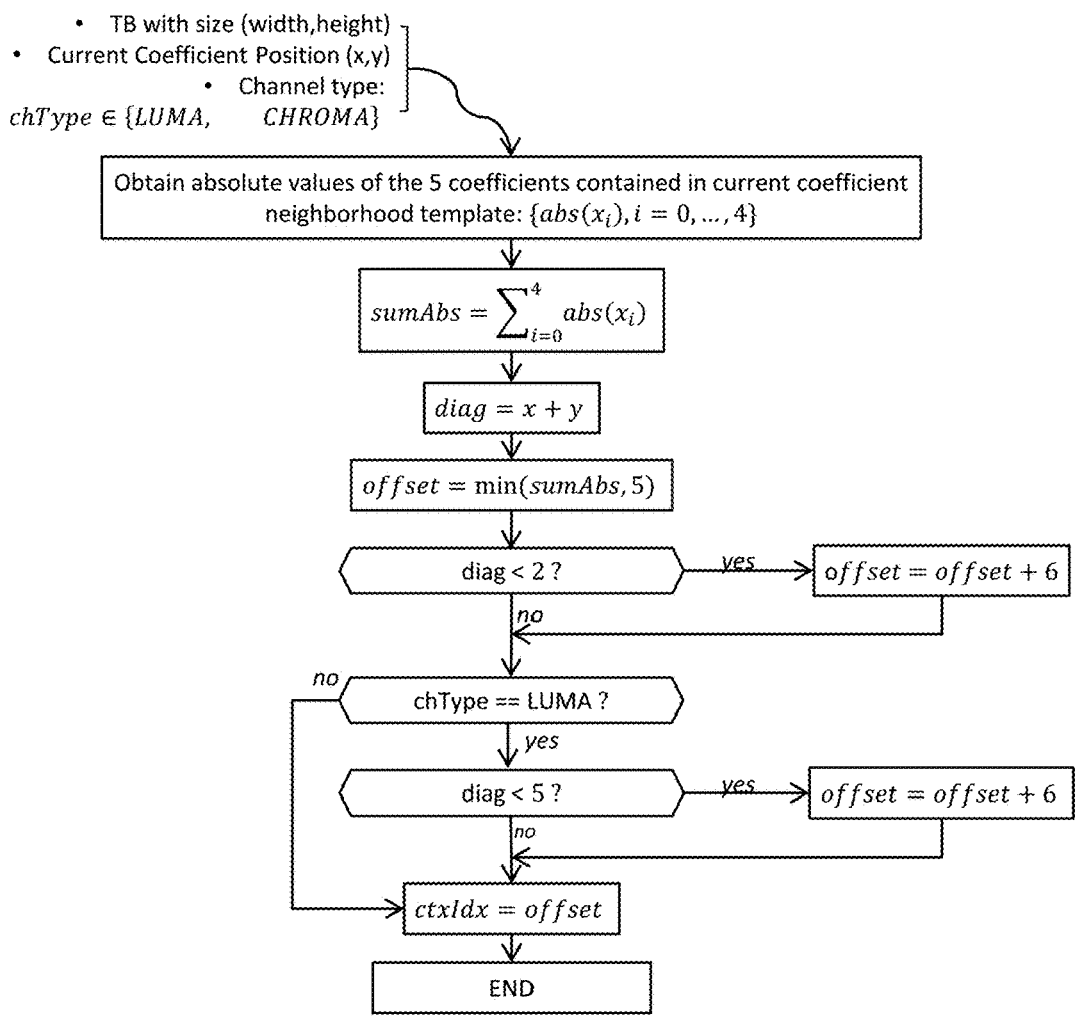
FIG. 11 illustrates the VVC draft 3 process to determine the context used to code the coefficient significance flag.

The context index computation according to the prior art is illustrated on FIG. 10, and depicted in FIG. 11. It depends on the values of the partially decoded coefficient values of previously decoded coefficients in the neighborhood covered by a local neighbor template (LNT). More specifically, the context index is determined based on the sum of the absolute values of neighboring coefficients, in their partially reconstructed state at the time the current coefficient is being processed. The template is depicted in FIG. 10. To capture the characteristics of transform coefficients at different frequencies, one transform block (TB) is split into up to three regions in a pre-fixed way, as illustrated on FIG. 10. Each TB region is shown with different grey levels, and the context indices assigned to each region are shown. For example, the first region (top-left part of the TB) is assigned the context indices 12 to 17.

The context index associated to a given transform coefficient X is computed as follows.

The sum of coefficients absolute values in the LNT is computed:

sumAbs=$\Sigma_{i=0}^{4}$abs($x_i$) where ($x_0, \ldots, x_4$) are the partially reconstructed coefficients located in the considered LNT of current coefficient X.

The index of the diagonal to which coefficient X belongs to is computed as the sum of its coordinates:

diag=posX(X)+poxY(X)

Finally, the context index for current coefficient X is computed as:

ctxIdx=(diag<2?6:0)+(diag<5?6:0)+min(sumAbs,5)

Luma and Chroma components are treated in a similar way but with separate sets of context models. The chroma case is illustrated in FIG. 10(*b*). One sees two regions are used for chroma instead of three. This is also illustrated on the algorithm of FIG. 11, where a test is performed on the channel type (i.e., luma/chroma), and some specific context index computation steps are performed for the Luma case and not for the Chroma channel type.

Finally, note that the context to signal the sig_flag is chosen based on 2 parameters: the context index computed as described above, and the current state of the state machine of FIG. 7.

Figure 12:
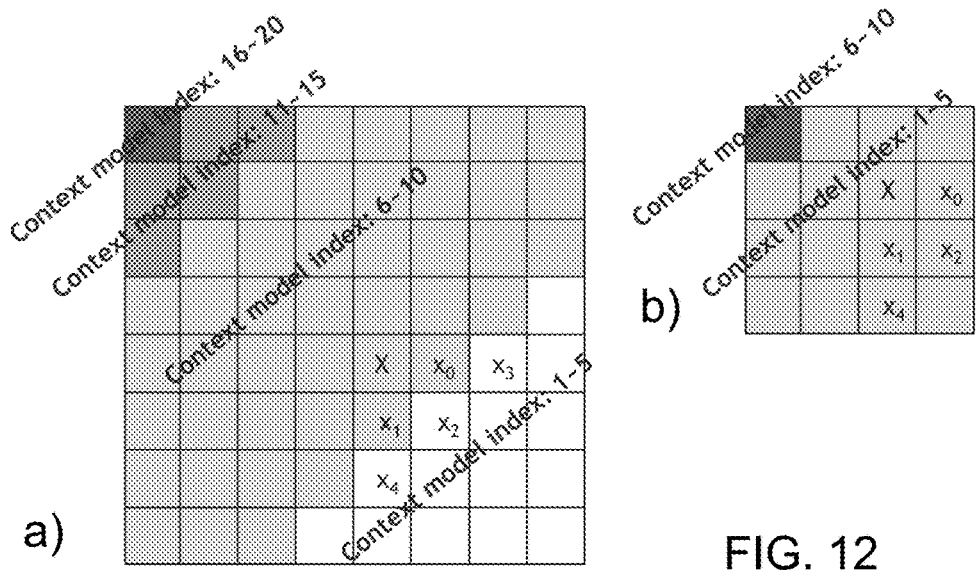
FIG. 12 illustrates contexts used in VVC draft 3 for the coding of flags GT1, parity and GT2 associated to each quantized coefficient, respectively in (a) Luma and in (b) Chroma.
Figure 13:
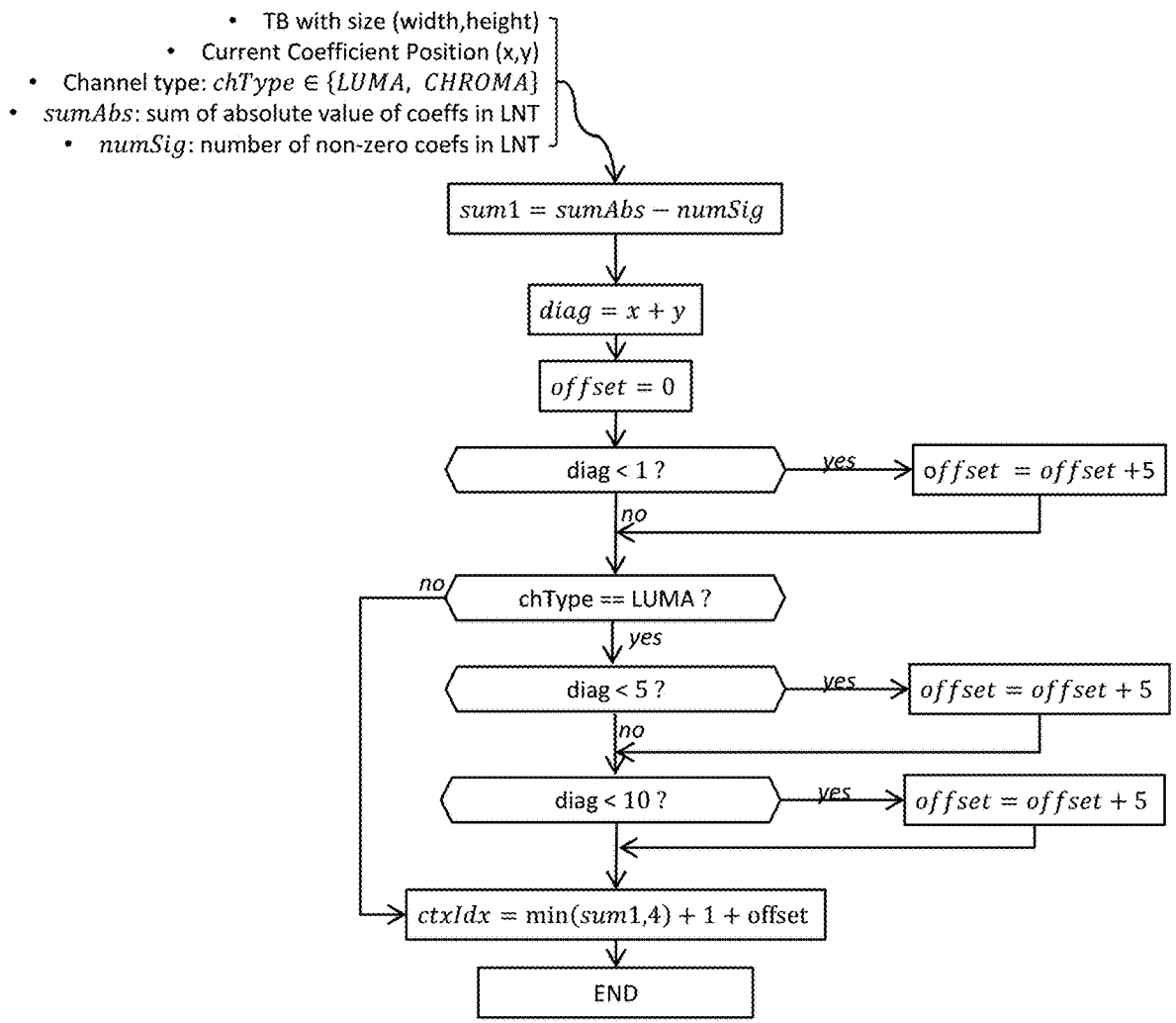
FIG. 13 illustrates the VVC draft 3 process to determine the context used to code the coefficient significance flag.

With respect to the syntax elements gt1_flag, par_flag and gt2_flag, a different method is used in VVC draft 3 for the context index computation. This process is illustrated by FIG. 12 and detailed by the algorithm of FIG. 13. Now this process is explained. First step of FIG. 13 computes the difference between the sum of absolute value sumAbs of coefficients already processed in the LNT and the number of non-zero coefficients in the LNT. This difference is noted sum1. Next, a context offset value noted offset is initialized to offset=0. Next steps consist in successively increasing the offset value by 5 depending on the diagonal position (diag=x+y) of the current coefficient, and on the diagonal-wise pre-defined regions used respectively in Luma and in Chroma channel types. Finally, the value taken by the context index is equal to ctxIdx=(min(sum1,4)+1)+offset, and is computed at the last step of FIG. 13. Note the context index is defined from 1 here, because the context with index 0 is used for the coding of some other syntax element of the coded bit-stream.

Therefore, as can be seen the LNT mechanism is used for all the flags, for each quantized coefficient to code or parse.

Generally speaking, the use of the LNT has the following particular drawbacks:

The LNT implies context selection dependencies. A large amount of decoder side operations is used to compute the context used to parse the significance information associated to a quantized coefficient.

A large number of contexts are used due to the LNT concept, since typically 6 potential contexts can be used to the sig_flag in each TB region, and 5 potential contexts can be used for each of the gt1_flag, par_flag and gt2_flag elements in each TB region.

In the following, methods are provided to adapt the use of such local neighbor templates for the transform coefficients to be encoded or decoded, in a way that ensures good coding efficiency and avoids compression-wise useless decoding steps and avoids compression-wise useless CABAC contexts. In particular, the presented methods concern the reduction of the LNT usage as a function of the transform block region and channel type considered.

Figure 14:
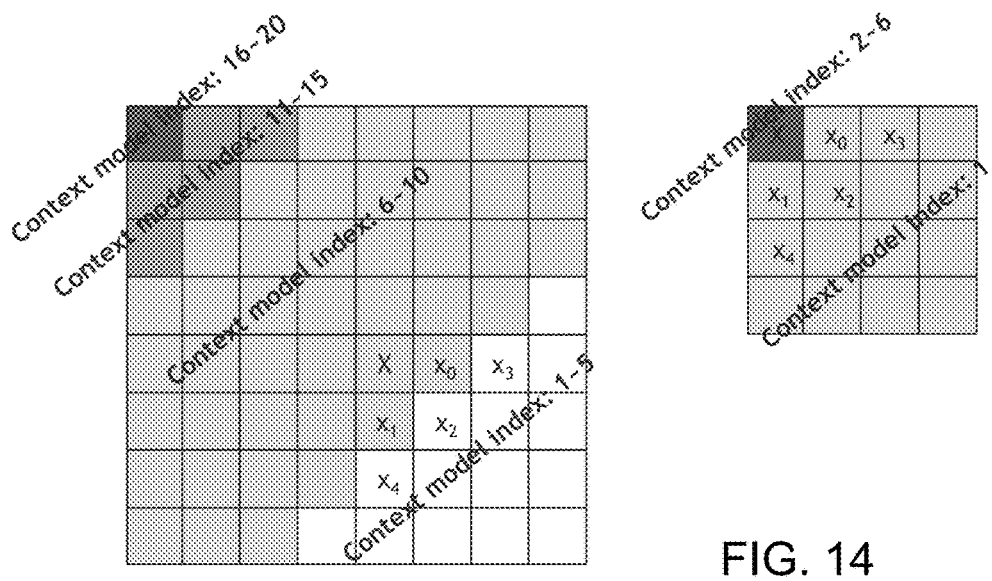
FIG. 14 illustrates a proposed context modelling for the CABAC coding of GT1, parity, GT2 flag for chroma blocks according to a first embodiment.
Figure 15:
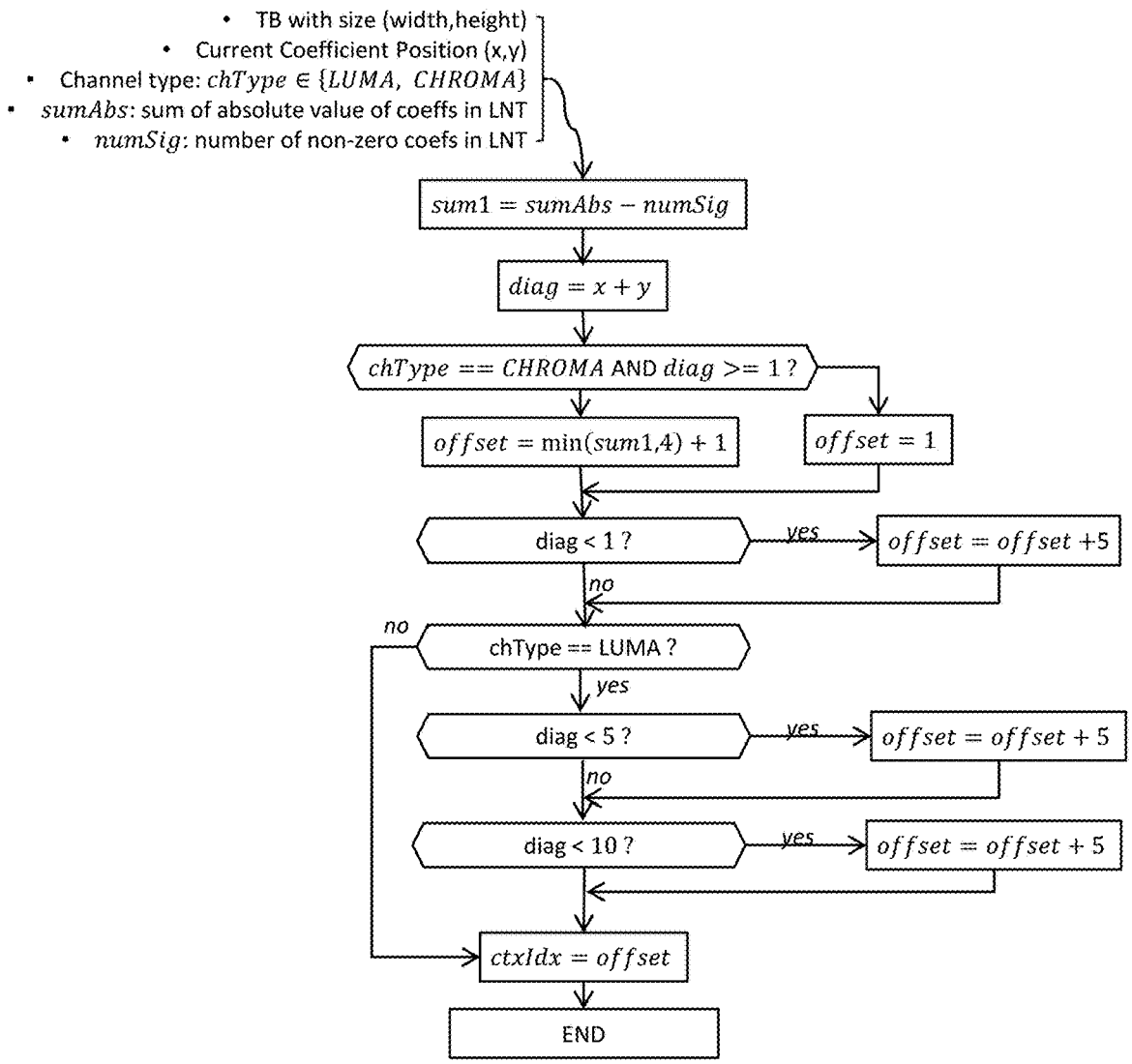
FIG. 15 illustrates the proposed process to compute the index of the CABAC context used to code GT1, parity and GT2 flags according to a first embodiment.

The first proposed embodiment is shown on FIG. 14 and on the algorithm of FIG. 15. It consists in a simplified context assignment process for the coding of the gt1_flag, par_flag and gt2_flag in the chroma TBs.

As can be seen on FIG. 14, in the proposed method, a modified context assignment is used in the chroma blocks. Indeed, the LNT process is used only for the lowest frequency coefficient of the chroma TB. For other coefficients, a single context index is used for other coefficients. This single context index is used for all the gt1_flag, par_flag and gt2_flag in chroma TBs. More generally, if x+y≥T, the transform coefficients share the same context index, and the lowest transform coefficient uses the template for deriving the context index.

The modified process is depicted by the algorithm of FIG. 15. Basically, a test is introduced to check if the current coefficient being process is different from the lowest frequency coefficient. If so, then the offset variable is set to the single value 1. Otherwise, it is set to (min(sum1,4)+1). Finally, the context index used to code/parse the gt1_flag, par_flag or gt2_flag elements is set to offset.

Note that 12 CABAC contexts (i.e., 4 contexts for each of gt1_flag, par_flag, gt2_flag) are suppressed from the codec design in the proposed embodiment 1. This is obtained with limited loss in coding efficiency, as can be seen on FIG. 16.

Figure 17:
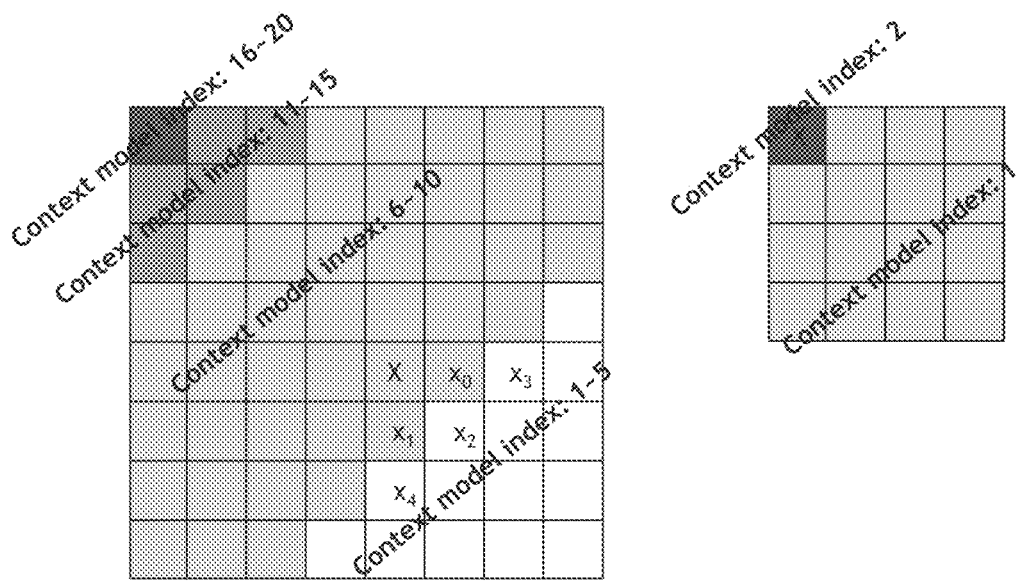
FIG. 17 illustrates a proposed context modelling for the CABAC coding of GT1, parity, GT2 flag for chroma blocks according to a second embodiment.

The second embodiment proposed in this disclosure, shown on FIG. 17, is a further simplified version of the first one, where a reduced number of contexts is used for the coding of gt1_flag, par_flag and gt2_flag of the lowest frequency coefficient employs one single CABAC context instead of 5 as in the prior art.

Therefore, a further reduced number of CABAC contexts is obtained in this embodiment, together with a reduced number of decoder side operations due to the complete removal of the LNT usage.

Figure 18:
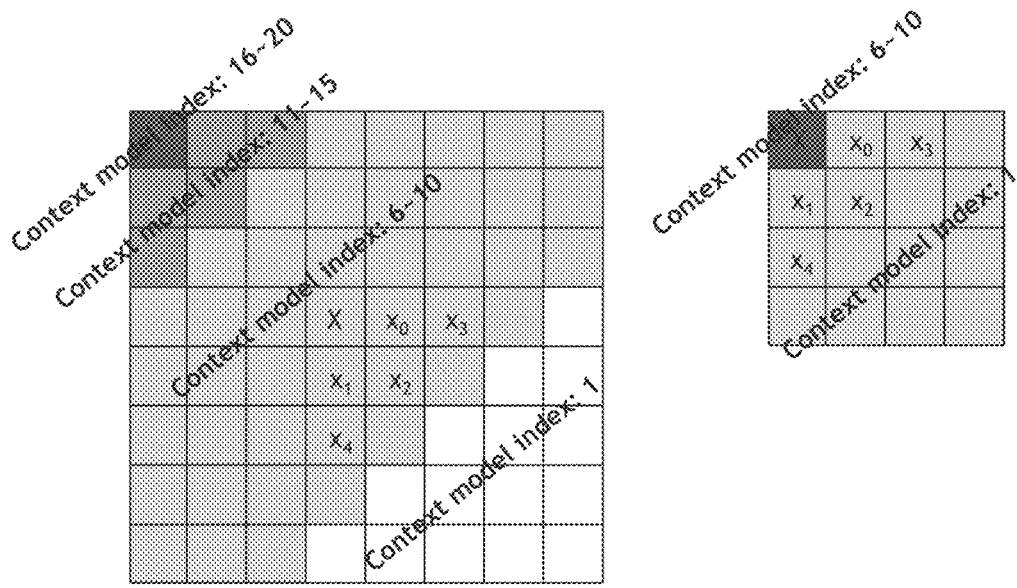
FIG. 18 illustrates a proposed context modelling for the CABAC coding of GT1, parity, GT2 flag for chroma blocks according to a third embodiment.

According to a third embodiment shown on FIG. 18, the concept of mixing the use of single context model and LNT usage according to the TB region and/or channel type is applied to the luma TB. Here, it is proposed to use a single context to encode the gt1_flag, par_flag and gt2_flag elements that belong to the highest frequency luma TB region (e.g., when $x+y \geq 8$). This approach may be a better trade-off than the second embodiment, between the reduction of CABAC contexts and LNT usage on one side, and the coding efficiency on the other side.

Figure 19:
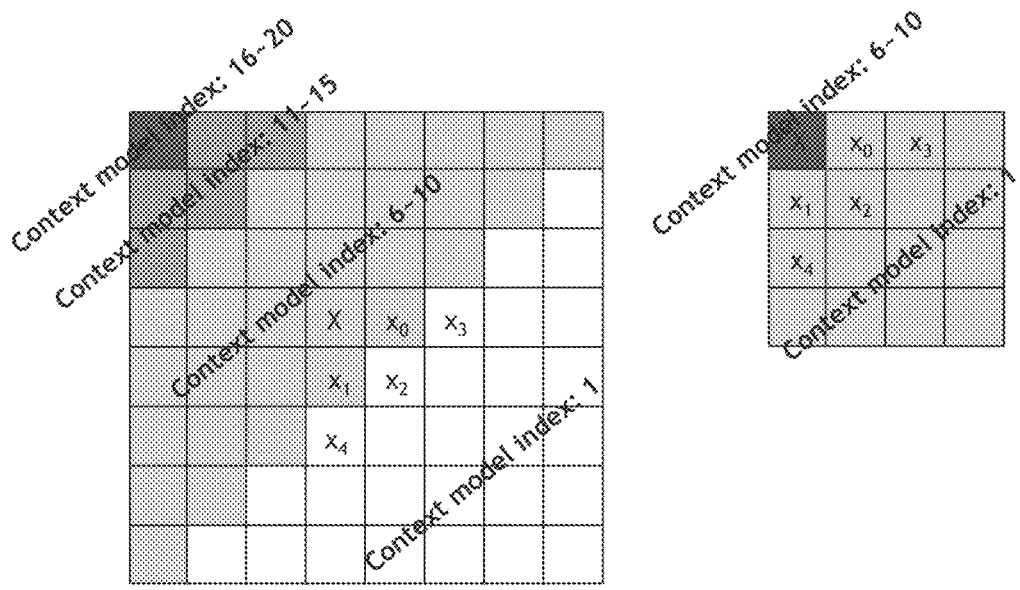
FIG. 19 illustrates a proposed context modelling for the CABAC coding of GT1, parity, GT2 flag for chroma blocks according to a forth embodiment.

In a variant of the third embodiment shown on FIG. 19, the luma TB region where the a single CABAC context is used for the coding of gt1_flag, par_flag and gt2_flag is further extended to a larger luma TB region compared to embodiment 3.

Figure 20:
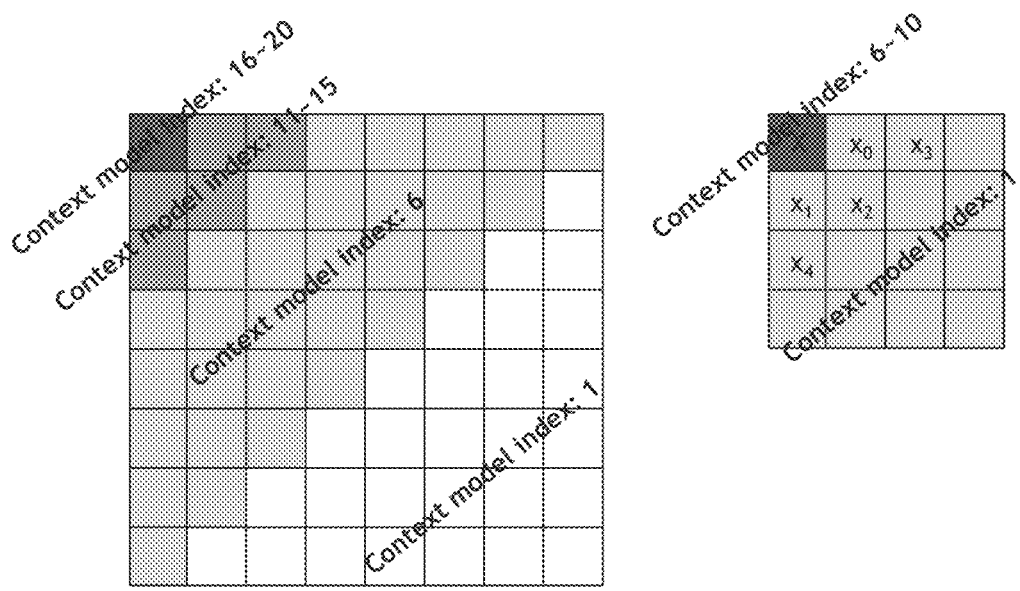
FIG. 20 illustrates a proposed context modelling for the CABAC coding of GT1, parity, GT2 flag for chroma blocks according to a fifth embodiment.

In a further variant, several luma TB regions may use a single CABAC context for the coding of the gt1_flag, par_flag and gt2_flag elements, see FIG. 20. For example, when $x+y \geq 8$, context index 1 is used; and when $3 \leq x+y \leq 7$, context model index 6 is used.

In a variant of the second embodiment, the coefficient of lowest frequency in the chroma channel may be coded/parsed with a number of contexts which is higher than one, but is reduced compared to existing approaches.

Figure 21:
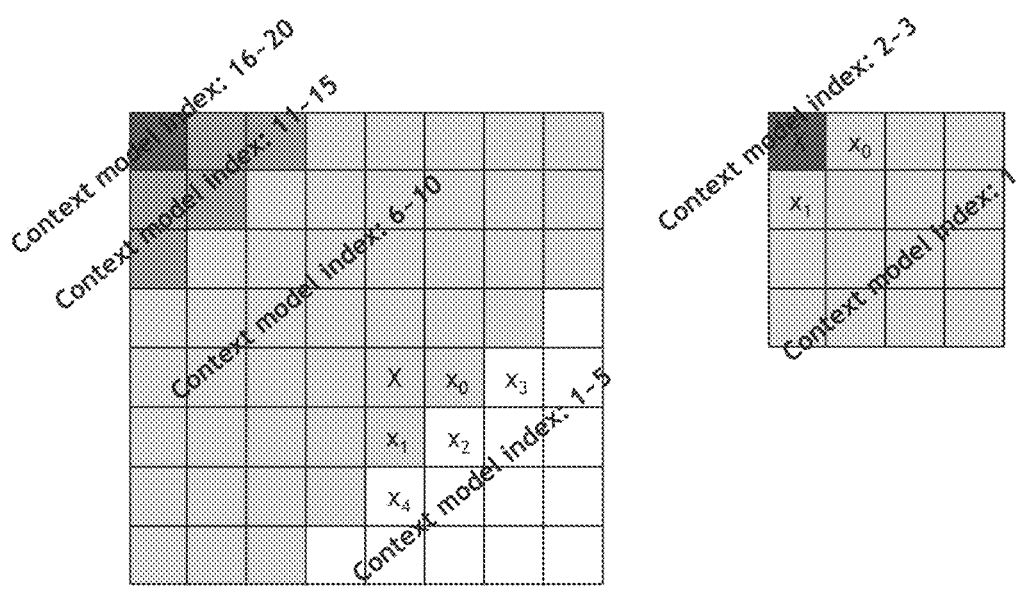
FIG. 21 illustrates a proposed context modelling for the CABAC coding of GT1, parity, GT2 flag for chroma blocks according to a sixth embodiment.

This is shown on FIG. 21. One sees the reduced number of contexts comes with a reduced size of the local neighboring template used for the coding of some bins for the lowest frequency chroma quantized coefficient. These bins may typically correspond to the gt1_flag, par_flag and gt2_syntax elements.

According to a further variant of the disclosure, the simplified context modelling as described in the above embodiments is also applied to the coding of the sig_flag syntax element.

According to another variant, the simplification of the context modelling for Chroma transform blocks may apply only on a part of the gt1_flag, par_flag and gt2_flag syntax elements. For example, it may apply only for the coding of the gt2_flag syntax element. According to another example, it may apply only to gt2_flag and par_flag syntax elements. According to a further variant it may apply only to the sig_flag. According to another variant, it may apply to the sig_flag and a subset of the gt1_flag, par_flag and gt2_flag syntax elements.

According to another variant, the simplification of the context modelling for Luma transform blocks may apply only on a part of the gt1_flag, par_flag and gt2_flag syntax elements. For example, it may apply only for the coding of the gt2_flag syntax element. According to another example, it may apply only to gt2_flag and par_flag syntax elements. According to another variant, it may apply to the sig_flag and a subset of the gt1_flag, par_flag and gt2_flag syntax elements.

The proposed embodiments can efficiently entropy code the quantized transform coefficients with a limited decoding process complexity, such as a reduced number of operations in the decoder process and/or contexts used for Context Adaptive Binary Arithmetic Coding (CABAC), by reducing the LNT usage as a function of the transform block region and channel type considered as mentioned above.

As described, the obtained context indices, used in controlling the probability model for arithmetic coding of syntax elements associated with the quantized transform coefficients, are based on the positions of the quantized transform coefficients. In particular, while different context model indices are obtained for quantized transform coefficients in different regions of the processed transform block, a single context index is used for at least one region of the transform block.

Figure 22:
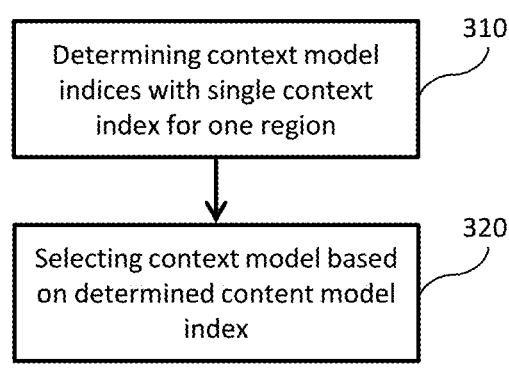
FIG. 22 illustrates a generic flowchart for a method according to an embodiment of the present disclosure.

A corresponding generic flowchart 300 is illustrated in FIG. 22. For one or more syntax elements of quantized transform coefficients of a transform block context model indices are determined in step 310, wherein different context model indices are obtained for quantized transform coefficients in different regions of the transform block and a single context index is used for at least one region of the transform block. Finally, for the one or more syntax elements associated with a particular quantized transform coefficient one of several context models are selected in step 320 based on the determined content model index.

Multiple quantized transform coefficients may share the same context index if the positions of these multiple quantized transform coefficients satisfy a certain condition, such as quantized transform coefficients with $x+y \geq T$, where x and y are horizontal and vertical positions of a transform coefficient. In one example $T=1$, namely, except the lowest frequency coefficient, all other coefficients share a single context. Also the quantized transform coefficients with $x+y<T$, may use a single context index. In one example $T=1$, namely, the lowest frequency coefficient uses a single context index. Furthermore, multiple quantized transform coefficients may use a limited set of context indices if the positions of these multiple quantized transform coefficients satisfy a certain condition.

Figure 23:
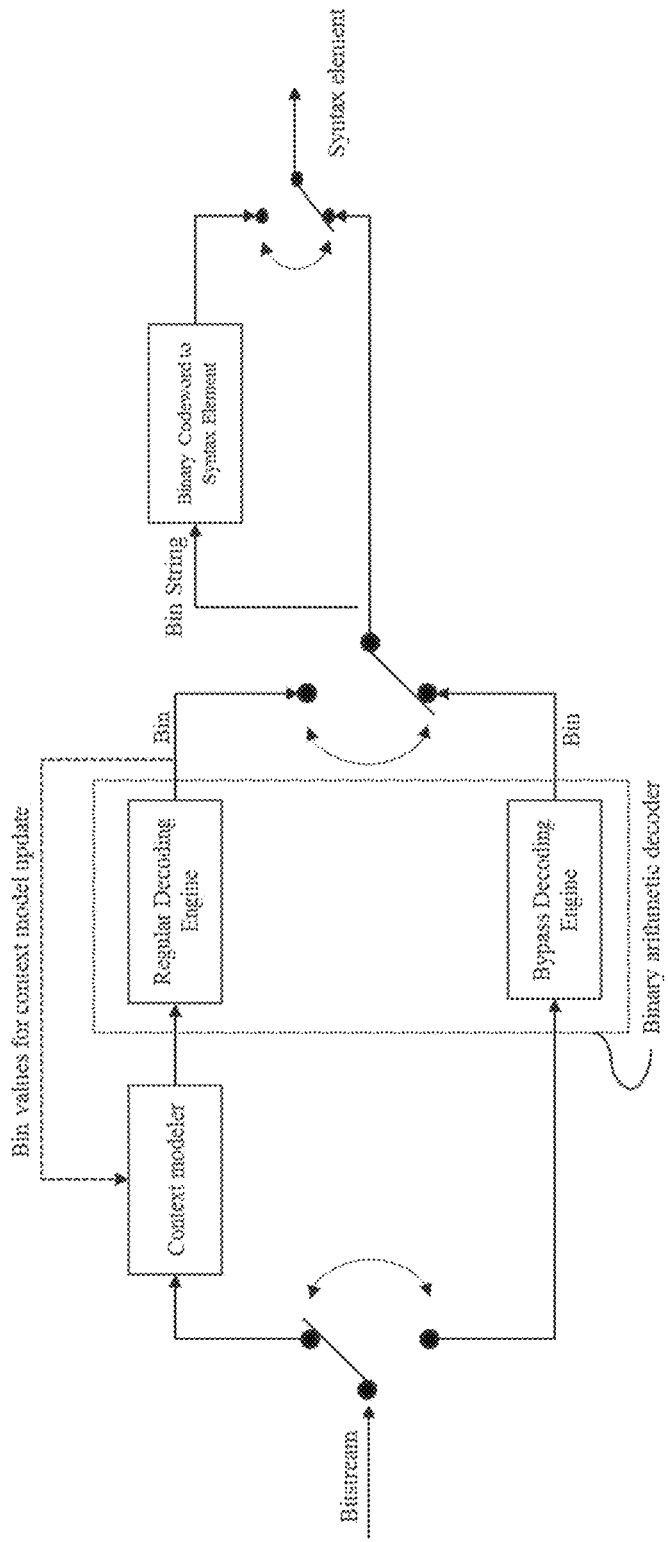
FIG. 23 illustrates the CABAC decoding process.
Figure 24:
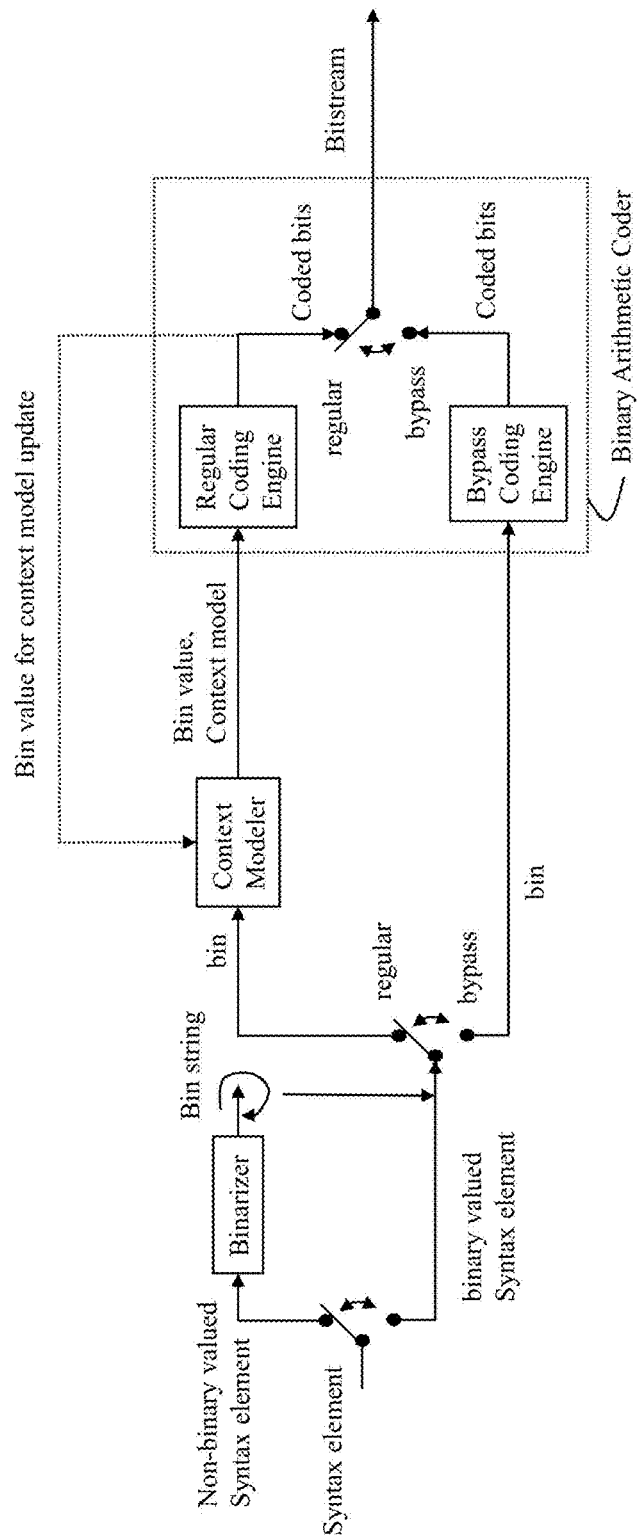
FIG. 24 illustrates the CABAC coding process.

In the following, a description of the internal CABAC (Context-Adaptive Binary Arithmetic Coding) decoding process is provided. FIG. 23 depicts the CABAC decoding process of a syntax element given the input coded bit-stream. This is the reciprocal process of the syntax element coding process of FIG. 24.

The input to the process of FIG. 23 consists in the coded bit-stream, typically conforming to the HEVC specification or a further evolution of it (e.g., VTM-1). At any point of the decoding process, the decoder knowns which syntax element is to be decoded next. This is fully specified in the standardized bitstream syntax and decoding process. Moreover, it also knows how the current syntax element to decoded is binarized (i.e. represented as a sequence of binary symbols called bins, each equal to '1' or '0'), and how each bin of the bin string has been encoded.

Therefore, the first stage of the CABAC decoding process (left side of FIG. 23) decodes a series of bins. For each bin, it knows if it has been encoded according to the bypass mode or the regular mode. The bypass mode consists in simply reading a bit in the bit-stream and assigning the so-obtained bit value to current bin. This mode has the advantage of being straightforward, hence fast. It is typically efficient thus used for bins that have a uniform statistical distribution, i.e. equal probability of being equal to '1' or '0'.

On the opposite, if current bin has not been coded in bypass mode, then it means it has been coded in so-called regular, i.e. through context-based arithmetic coding.

In that case, the decoding of considered bin proceeds as follows. First, a context is obtained for the decoding of current bin. It is given by the context modeler module shown on FIG. 23. The goal of the context is to obtain the conditional probability that current bin has value '0', given some contextual prior or information X. The prior X here the value of some already decoded syntax element, available both on the encoder and decoder side in a synchronous way, at the time current bin is being decoded.

Typically, the prior X used for the decoding of a bin is specified in the standard, and is chosen because it is statistically correlated with the current bin to decode. The interest of using this contextual information is that it reduces the rate cost of coding the bin. This is based on the fact that the conditional entropy of the bin given X is all the more low as the bin and X are correlated. The following relationship is well-known in information theory:

$$H(bin|X) < H(bin)$$

It means that the conditional entropy of bin knowing X is lower than the entropy of bin if bin and X are statistically correlated. The contextual information X is thus used to obtain the probability of bin being '0' or '1'. Given these conditional probabilities, the regular decoding engine of FIG. 23 performs the arithmetic decoding of the binary value bin. The value of bin is then used to update the value of the conditional probabilities associated to current bin, knowing the current contextual information X. This is called the context model updating step on FIG. 23. Updating the context model for each bin as long as the bins are being decoded (or coded), allows progressively refining the context modeling for each binary element. Thus, the CABAC decoder progressively learns the statistical behavior of each regular-encoded bin.

Note that the context modeler and the context model updating steps are strictly identical operations on the encoder and on the decoder sides.

The regular arithmetic decoding of current bin or its bypass decoding, depending on how it was coded, leads to a series of decoded bins.

The second phase of the CABAC decoding, shown on right side of FIG. 23, then consists in converting this series of binary symbols into higher level syntax elements. A syntax element may take the form of a flag, in which case it directly takes the value of current decoded bins. On the other side, if the binarization of current syntax element corresponds to a set of several bins according to considered standard specification, a conversion steps, called "Binary Codeword to Syntax Element" on FIG. 23, takes place.

This proceeds the reciprocal of the binarization step that was done by the encoder. The inverse conversion performed here thus consists in obtaining the value of these syntax elements based on their respective decoded binarized versions.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 25:
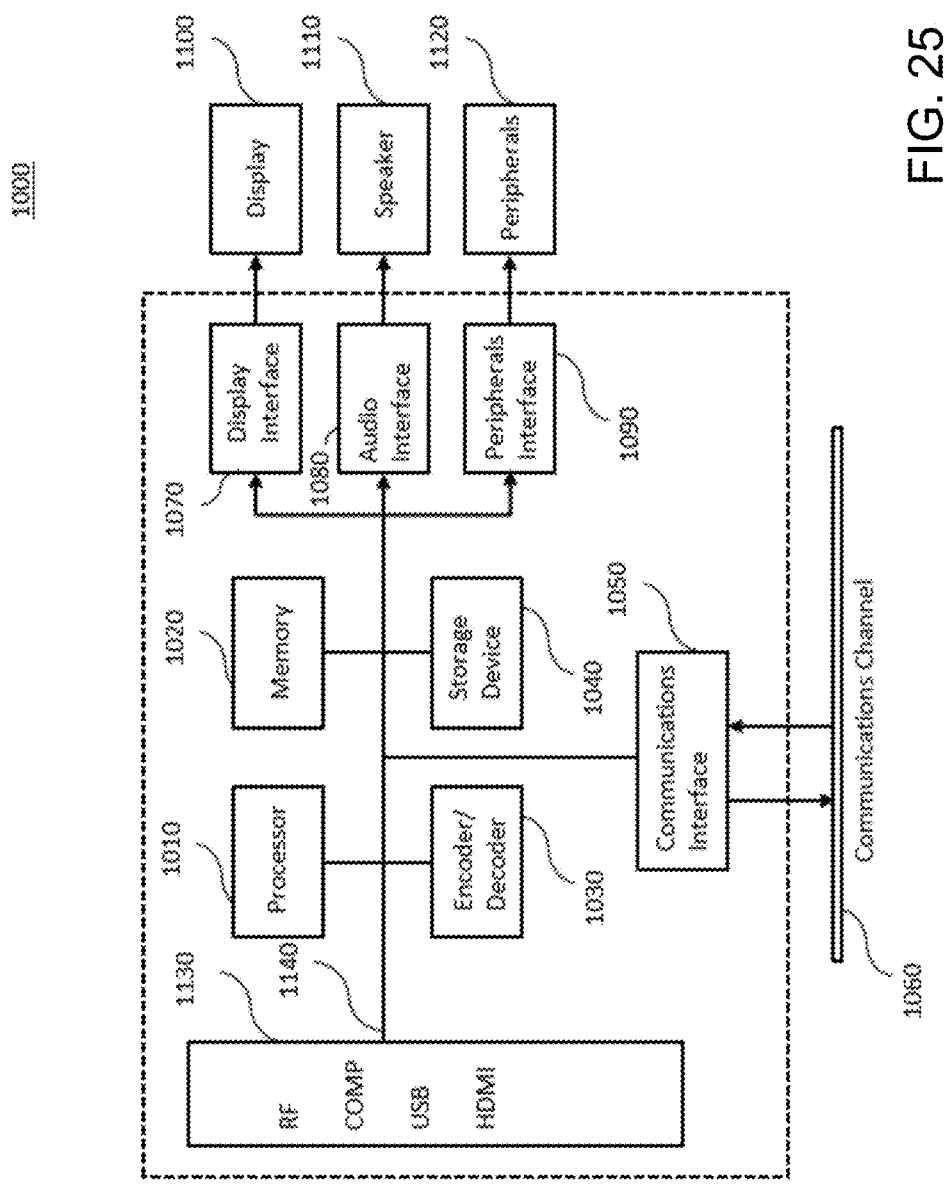
FIG. 25 illustrates a block diagram of an example of a system in which various aspects of the exemplary embodiments may be implemented.

The aspects described and contemplated in this application can be implemented in many different forms. FIGS. 1, 2 and 25 below provide some embodiments, but other embodiments are contemplated and the discussion of FIGS. 1, 2 and 25 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the entropy coding, and/or decoding modules (145, 230), of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 25 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 25, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing. Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other devices. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal.

Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The invention claimed is:

1. A method for encoding a picture, comprising:
splitting a chroma transform block into two regions, wherein a first region comprises one or more lower frequency quantized transform coefficients and a second region comprises a plurality of higher frequency quantized transform coefficients;
determining context model indices for one or more syntax elements of quantized transform coefficients of the chroma transform block, wherein different context model indices are obtained for quantized transform coefficients in different regions of the chroma transform block, and wherein a single context index is used for said first region of the chroma transform block and another single context index is used for said second region of the chroma transform block;
splitting a luma transform block corresponding to the chroma transform block into a plurality of regions, wherein each region of said plurality of regions comprises one or more quantized transform coefficients, and wherein multiple context indices are used for each of said plurality of regions for the luma transform block;
selecting for the one or more syntax elements associated with a particular quantized transform coefficient one of several context models based on the determined content model index, and
binary arithmetic encoding the one or more syntax elements according to the selected context model.

2. The method of claim 1, wherein in the first region of the chroma transform block a first predefined context index is used and in a second region of the chroma transform block a second predefined context index is used.

3. The method of claim 1, further comprising:
determining a channel type of the transform block and performing the determination of context model indices and selection of context models depending on the determined channel type.

4. The method of claim 1, wherein a context model index for a quantized transform coefficient for the luma transform block depends on neighboring higher frequency quantized transform coefficients.

5. A non-transitory machine readable medium having stored thereon machine executable instructions that, when executed, implement an encoding method according to claim 1.

6. An apparatus for encoding a picture, comprising one or more processors, wherein said one or more processors are configured to:

split a chroma transform block into two regions, wherein a first region comprises one or more lower frequency quantized transform coefficients and a second region comprises a plurality of higher frequency quantized transform coefficients;

determine context model indices for one or more syntax elements of quantized transform coefficients of the chroma transform block, wherein different context model indices are obtained for quantized transform coefficients in different regions of the chroma transform block, and wherein a single context index is used for said first region of the chroma transform block and another single context index is used for said second region of the chroma transform block;

split a luma transform block corresponding to the chroma transform block into a plurality of regions, wherein each region of said plurality of regions comprises one or more quantized transform coefficients, and wherein multiple context indices are used for each of said plurality of regions for the luma transform block;

select for the one or more syntax elements associated with a particular quantized transform coefficient one of several context models based on the determined content model index; and binary arithmetic encode the one or more syntax elements according to the selected context model.

7. The apparatus of claim 6, wherein in said first region of the chroma transform block a first predefined context index is used and in a second region of the chroma transform block a second predefined context index is used.

8. The apparatus of claim 6, wherein said one or more processors are further configured to determine a channel type of the transform block and to perform the determination of context model indices and selection of context models depending on the determined channel type.

9. The apparatus of claim 6, wherein a context model index for a quantized transform coefficient for the luma transform block depends on neighboring higher frequency quantized transform coefficients.

10. A method for decoding a picture, comprising:

splitting a chroma transform block into two regions, wherein a first region comprises one or more lower frequency quantized transform coefficients and a second region comprises a plurality of higher frequency quantized transform coefficients;

determining context model indices for one or more syntax elements of quantized transform coefficients of the chroma transform block, wherein different context model indices are obtained for quantized transform coefficients in different regions of the chroma transform block, and wherein a single context index is used for said first region of the chroma transform block and another single context index is used for said second region of the chroma transform block;

splitting a luma transform block corresponding to the chroma transform block into a plurality of regions, wherein each region of said plurality of regions comprises one or more quantized transform coefficients, and wherein multiple context indices are used for each of said plurality of regions for the luma transform block;

selecting for the one or more syntax elements associated with a particular quantized transform coefficient one of several context models based on the determined content model index; and binary arithmetic decoding the one or more syntax elements according to the selected context model.

11. The method of claim 10, wherein in the first region of the chroma transform block a first predefined context index is used and in a second region of the chroma transform block a second predefined context index is used.

12. The method of claim 10, further comprising determining a channel type of the transform block and performing the determination of context model indices and selection of context models depending on the determined channel type.

13. The method of claim 10, wherein a context model index for a quantized transform coefficient for the luma transform block depends on neighboring higher frequency quantized transform coefficients.

14. A non-transitory machine readable medium having stored thereon machine executable instructions that, when executed, implement a decoding method according to claim 10.

15. An apparatus for decoding a picture, comprising one or more processors, wherein said one or more processors are configured to:

split a chroma transform block into two regions, wherein a first region comprises one or more lower frequency quantized transform coefficients and a second region comprises a plurality of higher frequency quantized transform coefficients;

determine context model indices for one or more syntax elements of quantized transform coefficients of the chroma transform block, wherein different context model indices are obtained for quantized transform coefficients in different regions of the chroma transform block, and wherein a single context index is used for said first region of the chroma transform block and another single context index is used for said second region of the chroma transform block;

split a luma transform block corresponding to the chroma transform block into a plurality of regions, wherein each region of said plurality of regions comprises one or more quantized transform coefficients, and wherein multiple context indices are used for each of said plurality of regions for the luma transform block;

select for the one or more syntax elements associated with a particular quantized transform coefficient one of several context models based on the determined content model index; and binary arithmetic decode the one or more syntax elements according to the selected context model.

16. The apparatus of claim 15, wherein in said first region of the chroma transform block a first predefined context index is used and in a second region of the chroma transform block a second predefined context index is used.

17. The apparatus of claim 15, wherein said one or more processors are further configured to determine a channel type of the transform block and to perform the determination of context model indices and selection of context models depending on the determined channel type.

18. The apparatus of claim 15, wherein a context model index for a quantized transform coefficient for the luma transform block depends on neighboring higher frequency quantized transform coefficients.

* * * * *